United States Patent
Hida

(10) Patent No.: US 12,111,851 B1
(45) Date of Patent: Oct. 8, 2024

(54) DYNAMIC CLASSIFICATION OF TIME-SERIES CATEGORICAL DATA

(71) Applicant: Fujitsu Limited, Kawasaki (JP)

(72) Inventor: Yusuke Hida, Pittsburgh, PA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/188,404

(22) Filed: Mar. 22, 2023

(51) Int. Cl.
*G06F 16/00* (2019.01)
*G06F 16/2457* (2019.01)
*G06F 16/2458* (2019.01)
*G06F 16/28* (2019.01)
*G06F 16/29* (2019.01)

(52) U.S. Cl.
CPC ...... *G06F 16/285* (2019.01); *G06F 16/24575* (2019.01); *G06F 16/2477* (2019.01); *G06F 16/29* (2019.01)

(58) Field of Classification Search
None
See application file for complete search history.

(56) References Cited

PUBLICATIONS

Joulin et al., "Bag of Tricks for Efficient Text Classification" Aug. 9, 2016.
Kim "Convolutional Neural Networks for Sentence Classification" Sep. 3, 2014.
Lai et al., "Recurrent convolutional neural networks for text classification" Jan. 2015.
Zhang et al., "Character-level Convolutional Networks for Text Classification" Feb. 2015.

*Primary Examiner* — Anhtai V Tran
(74) *Attorney, Agent, or Firm* — Maschoff Brennan

(57) ABSTRACT

A method may include obtaining position data and associated time entries for multiple individuals. The method may also include, for each of the individuals, associating instances of the position data with categories of locations to generate a context vector, where the context vector includes text strings describing a context of a given individual. The method may also include, for each of the individuals, squeezing the context vector to combine consecutive categories of locations to generate a count vector, where the count vector includes the text strings and a count of the consecutive categories of locations. The method may also include classifying each of the individuals based on a comparison of the count vector to a known class of individuals, and adjusting at least one factor directing flow of multiple people in a different manner based on the classification.

20 Claims, 8 Drawing Sheets

DYNAMIC CLASSIFICATION OF TIME-SERIES CATEGORICAL DATA

FIELD

The embodiments discussed in the present disclosure are related to dynamic classification of time-series categorical data.

BACKGROUND

Time-series of data are often large and complex, and can be difficult to ascertain or categorize. This becomes particularly troublesome when human behavior is involved, as each individual has their own freedom to make choices and so categorizing such data is often expensive in computational costs, storage of data, and other costs. Furthermore, such categorization may not be entirely accurate, or may be missing certain aspects of the data that are important to understand.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to one embodiment, a method may include obtaining position data and associated time entries for multiple individuals. The method may also include, for each of the individuals, associating instances of the position data with categories of locations to generate a context vector, where the context vector includes text strings describing a context of a given individual. The method may also include, for each of the individuals, squeezing the context vector to combine consecutive categories of locations to generate a count vector, where the count vector includes the text strings and a count of the consecutive categories of locations. The method may also include classifying each of the individuals based on a comparison of the count vector to a known class of individuals, and adjusting at least one factor directing flow of multiple people in a different manner based on the classification.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
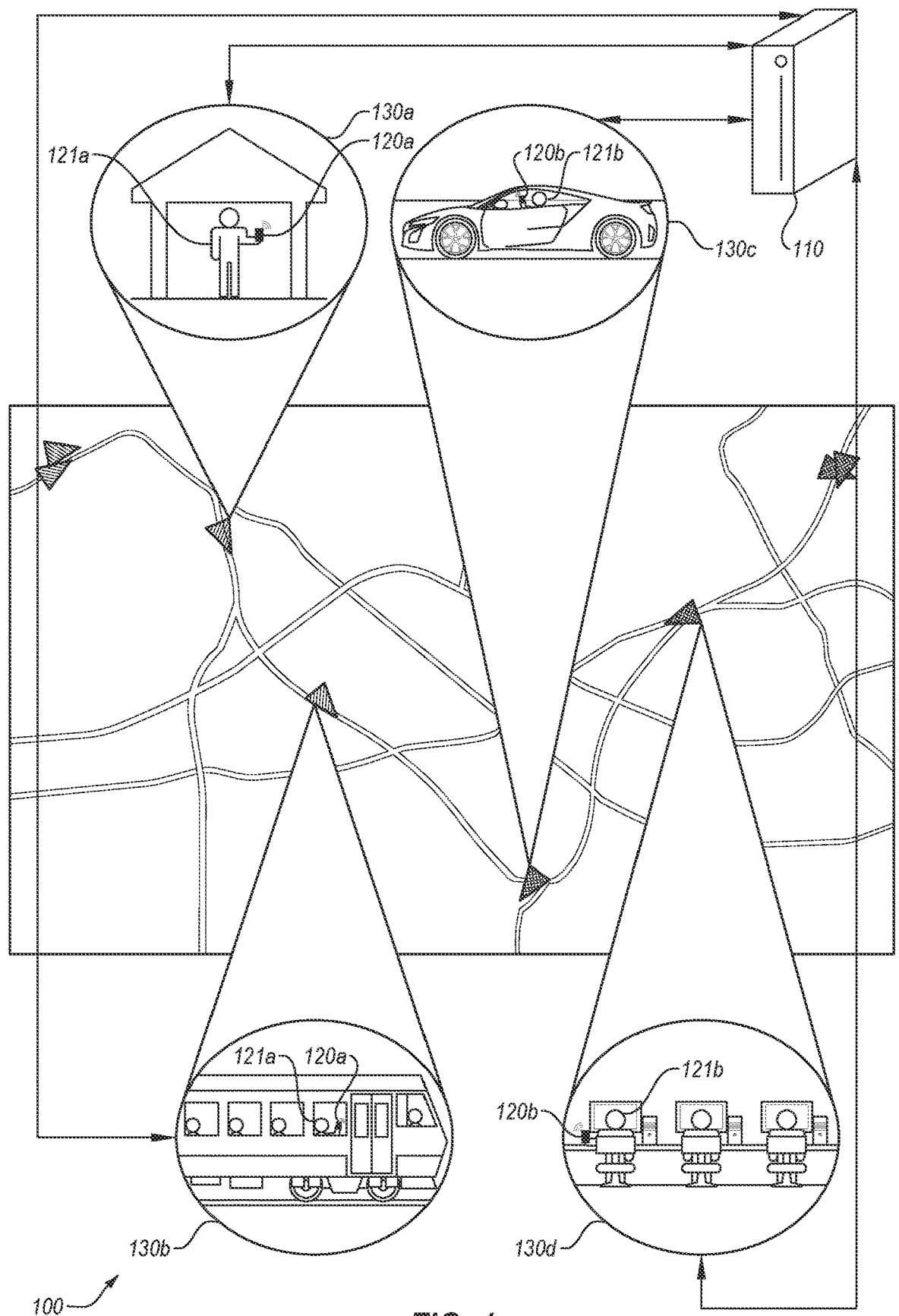
FIG. 1 is a diagram representing an example environment related to dynamic classification of time-series categorical data.

Representations of the movement of people are difficult to capture and express in usable forms. However, efforts have been made to provide data representations of individuals, both in the real world and in a simulation of expected behaviors of individuals. In some circumstances, the movement of people can be used to navigate or solve macro-level problems such as traffic congestion, flow of people, and other related issues. The present disclosure relates to improvements associated with the tracking, processing, classification, and displaying of time-series data, such as that related to movement of individuals over time. By improving the classification of individuals, better predictions of the flow of large numbers of people may be obtained which may allow for the intentional improvement of the flow of people.

In some embodiments, to facilitate classification of individuals, position data associated with one or more individuals may be captured and various instances of the position data may be associated with categories of locations (e.g., at home, traveling, at work) to generate a context vector. The context vector may include text strings corresponding to the context of a given individual at a series of points in time. The context vector may be squeezed to combine consecutive categories of locations to generate a count vector. For example, if there are consecutive instances of "at home" text strings, the entire set of consecutive instances may be combined into a single instance of "at home." The count vector may include an indication of a quantity of consecutive instances that are combined into the single instance. For example, if there are three consecutive instances of "at home" text strings, the entire set of consecutive instances may be combined into a single instance of "at home" while maintaining an indication that three instances are represented by that single instance.

In these and other embodiments, the count vector may be used to classify each of the individuals into a known class by comparing their respective count vectors with the known classes. For example, a given individual may be classified as "works from home," or "works in the office all day." In these and other embodiments, a factor may be adjusted to direct the flow of individuals in a different manner based on the classification. For example, if a large number of people are classified as "works in the office all day" for a given locale such that they will be traveling at the same time, certain roadways may have increased tolls, certain discounts may be offered for public transit during the commute time, or other such factors may be adjusted to influence the flow of traffic to mitigate congestion or other issues associated with the flow of people.

According to one or more embodiments of the present disclosure, the operation of computers associated with large amounts of data may operate more efficiently and be able to better classify individuals to assist in the flow of people. For example, the count vector may utilize less space than the context vector, permitting a savings in storage. This may be noteworthy when large numbers of people (thousands or millions) are involved. As another example, the use of the count vector may permit a numerical or graphical comparison to known values, where text strings alone such as those of the context vector may not permit such analyses. By permitting the more robust numerical comparison, a more accurate classification may be utilized. The more accurate classification may in turn permit more accurate predictions of the flow of people and more effective actions to manage the flow of people.

Embodiments of the present disclosure are explained with reference to the accompanying drawings.

FIG. 1 is a diagram representing an example environment 100 related to dynamic classification of time-series categorical data, in accordance with one or more embodiments of the present disclosure. A server 110 or other computing device may gather or otherwise obtain position data of candidate individuals to facilitate the classification of the candidate individuals and monitor or predict the flow of people to facilitate the flow of individuals. Operation of the server 110 may be described in greater detail with reference to FIGS. 2-6.

As illustrated in FIG. 1, position data of a first individual 121a may be detected at various times throughout a given day as designated by the locations 130a and 130b. For example, an electronic device 120a of the first individual 121a may include a global positioning system (GPS) chip or other sensor configured to generate position data for the first individual 121a. Additionally, position data of a second individual 121b may also be detected at various times throughout the day via an electronic device 120b of the second individual 121b. The position data for the first individual 121a and/or the second individual 121b may be communicated to the server 110. For example, a wireless communication over WiFi or over a cellular connection may be utilized to convey position data to the server 110.

Various examples of locations and associated categories are depicted by the locations 130a-130d which may be represented by the position data communicated by the electronic devices 120a/120b of the first and second individuals 121a/121b.

Location 130a may include an instance in which the first individual 121a may be at their home and the electronic device 120a may convey that information to the server 110. For example, GPS sensor data, being connected to a home WiFi network, or any other information may convey that the first individual 121a is at home. In some embodiments, a threshold amount of movement may be included and still classify the first individual 121a as at home. For example, variations within a 50-meter radius may qualify as being within the same location of being "at home."

Location 130b may include an instance in which the first individual 121a may be traveling on a train and the electronic device 120a may convey that information to the server 110. For example, GPS sensor data, a rate of change of the GPS sensor data (e.g., a speed of travel), being connected to a train WiFi network, passing wireless signal beacons, changing cellular tower connections, or any other information may convey that the first individual 121a is traveling. In some embodiments, secondary data may be utilized to identify the modality by which the first individual 121a is traveling. For example, train ticket purchases, electronic scanning of transit passes, the network to which the electronic device 120a of the first individual 121a is connected, or any other data may be used to identify the modality by which the first individual 121a is traveling (e.g., by automobile or by train).

Location 130c may include an instance in which the second individual 121b may be traveling by automobile and the electronic device 120b may convey that information to the server 110. For example, GPS sensor data, a rate of change of the GPS sensor data (e.g., a speed of travel), connecting to a vehicular entertainment system, passing wireless signal beacons, changing cellular tower connections, paying tolls for roads, or any other information may convey that the second individual 121b is traveling. In some embodiments, secondary data may be utilized to identify the modality by which the second individual 121b is traveling. For example, toll purchases, electronic scanning of travel/toll passes, the network to which the electronic device 120b of the second individual 121b is connected, or any other data may be used to identify the modality by which the second individual 121b is traveling (e.g., by automobile or by train).

Location 130d may include an instance in which the second individual 121b may be at their office and the electronic device 120b may convey that information to the server 110. For example, GPS sensor data, being connected to an office WiFi network, or any other information may convey that the second individual 121b is at their office. In some embodiments, a threshold amount of movement may be included and still classify the second individual 121b as at the office. For example, variations within a 50-meter radius may qualify as being within the same location at the office of the second individual 121b.

Modifications, additions, or omissions may be made to FIG. 1 without departing from the scope of the present disclosure. For example, the environment 100 may include more or fewer elements than those illustrated and described in the present disclosure. Additionally, while various locations and examples of travel are included, it will be appreciated that any number of known locations and associated classifications or categories are contemplated. For example, a favorite restaurant, a local grocery store, a school or university, or any other such locations are contemplated. Additionally or alternatively, various modalities of travel are contemplated, such as traveling by train, bus, car, ride-share, bicycle, motorcycle, walking, etc. are all contemplated.

Figure 2:
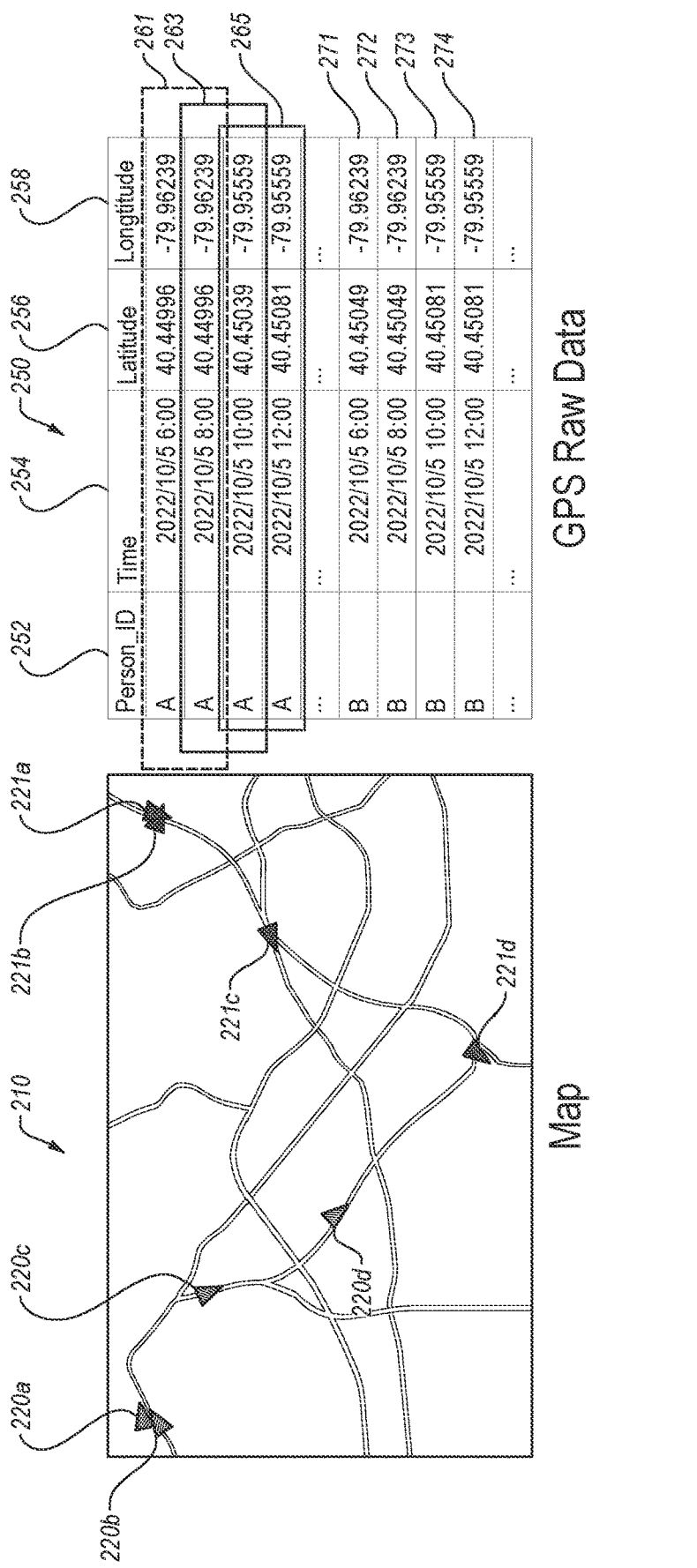
FIG. 2 illustrates an example map and associated position data associated with various users which may be used in dynamic classification of time-series categorical data.

FIG. 2 illustrates an example map 210 and associated position data 250 associated with various users which may be used in dynamic classification of time-series categorical data, in accordance with one or more embodiments of the present disclosure. The position data 250 may include data for multiple people, identified by Person_ID 252 as either Person A or Person B (although many other individuals are contemplated, such as hundreds, thousands, or millions). Additionally, the position data 250 may include Time 254, Latitude 256, and Longitude 258.

By way of example, in correlating the map 210 to the position data 250, line 271 may correspond to the point 221a on the map 210 in which the Person B is at a first location at 6:00 and line 272 may correspond to the point 221b on the map 210 in which the Person B is also at the first location at 8:00. The line 273 may correspond to the point 221c in which the Person B is at a second location on the map, and the line 274 may correspond to the point 221d in which the Person B is at a third different location. For example, the first location may be the home of Person B, the third location may be an office of the Person B, and the second location may be some intermediate location as the Person B travels from their home to the office.

In some embodiments, the association of these instances of data with a given category of location may be based on known data about the respective person. For example, a home address and a work address may be known for the Person A such that when their GPS coordinates via latitude and longitude correspond to their home address, that instance of position data may be associated with a category of "home." Similarly, when the GPS coordinates correspond to the office address, that instance of position data may be associated with the category of "office." Additionally or alternatively, continuously changing GPS coordinates between known locations may be categorized as "travel." In some embodiments, the rate at which the GPS sensor data is changing (e.g., conveying a speed of travel of 70 kilometers per hour) may also or alternatively be used to identify that the person is traveling.

In some embodiments, a set of known categories of locations may be set by a programmer or administrator when setting up a system consistent with the present disclosure to classify individuals. Additionally or alternatively, individuals may add or select various locations when interacting with such a system. For example, a given individual may designate their home address, work address, preferred local grocery store, gym, school, church, preferred modality of travel, etc. when interacting with the system.

While illustrated as occurring in two-hour blocks, it will be appreciated that the raw position data may be gathered at any frequency. Additionally or alternatively, different individuals may have data captured at different rates, and in such circumstances, the position data may be normalized such that each candidate individual has a consistent set of data for a given period of time. Such normalization may include removing data from over-sampled individuals, replicating data for under-sampled individuals (e.g., repeating a previous location, a next location, or some combination or variation thereof), or any combinations thereof. For example, the normalization may create a given location for each fifteen minutes, each thirty minutes, each hour, each two hours, or any other regular amount of time.

As illustrated in FIG. 2, various bounding boxes, such as the bounding boxes 261, 263, and 265, may be utilized to convey a categorization of location. For example, the bounding box 261 may indicate that for the time from 6:00 to 8:00 the Person A is at the same location, such as the home of the Person A. The second bounding box 263 may indicate that between the 8:00 and 10:00, the Person A began to travel, and the third bounding box 265 may indicate that between 10:00 and 12:00 the Person A arrived at their office.

Continuing the examples of Person A and Person B, a context vector may be generated for the Person A based on the categorization illustrated by the bounding boxes 261, 263, and/or 265. For example, the context vector may include {"home," "home," "traveling," "office," . . . }. As another example, the context vector for Person B may include {"home," "home," "traveling," "office," . . . }. In these and other embodiments, the context vector may include a series of text strings that correspond to the categorization of the position data.

After obtaining the context vector, the context vector may be squeezed. As used herein, the term "squeeze" may refer generally to a compression or simplification of data to provide a more data-compact representation of the data. Various examples of squeezing of context vectors are provided for illustrative purposes. The following context vectors may be illustrated before being squeezed (a context vector) and after being squeezed (a count vector). For example, the context vector:

{"home", "home", "move", "move", "office", "office", "office", "office", "office", "office"} may be squeezed to generate a count vector that includes:
{"home":2, "move":2, "office":6}.

As another example, the context vector
{"home", "home", "home", "move", "office", "office", "office", "office", "office", "office"} may be squeezed to generate a count vector that includes:
{"home":3, "move":1, "office":6}.

As another example, the context vector
{"home", "home", "home", "home", "home", "home", "move", "office", "office", "office"} may be squeezed to generate a count vector that includes:
{"home":6, "move": 1, "office":3}.

As another example, the context vector
{"home", "home", "move", "office", "office", "move", "home", "home", "home", "home"} may be squeezed to generate a count vector that includes:
{"home":2, "move":1, "office":2, "move":1, "home":4}.

In some embodiments, a given day or span of time represented by the count vector may be represented by one or more visualizations or curves representative of the movement of a given person. Additionally or alternatively, the count vectors and/or the associated visualizations or curves of various individuals may be used to facilitate classification of those individuals. Examples of such classification may be described with greater detail in reference to FIGS. 3A-4.

Modifications, additions, or omissions may be made to FIG. 2 without departing from the scope of the present disclosure. For example, the map 210 and/or the position data 250 may include more or fewer elements than those illustrated and described in the present disclosure.

Figure 3A:
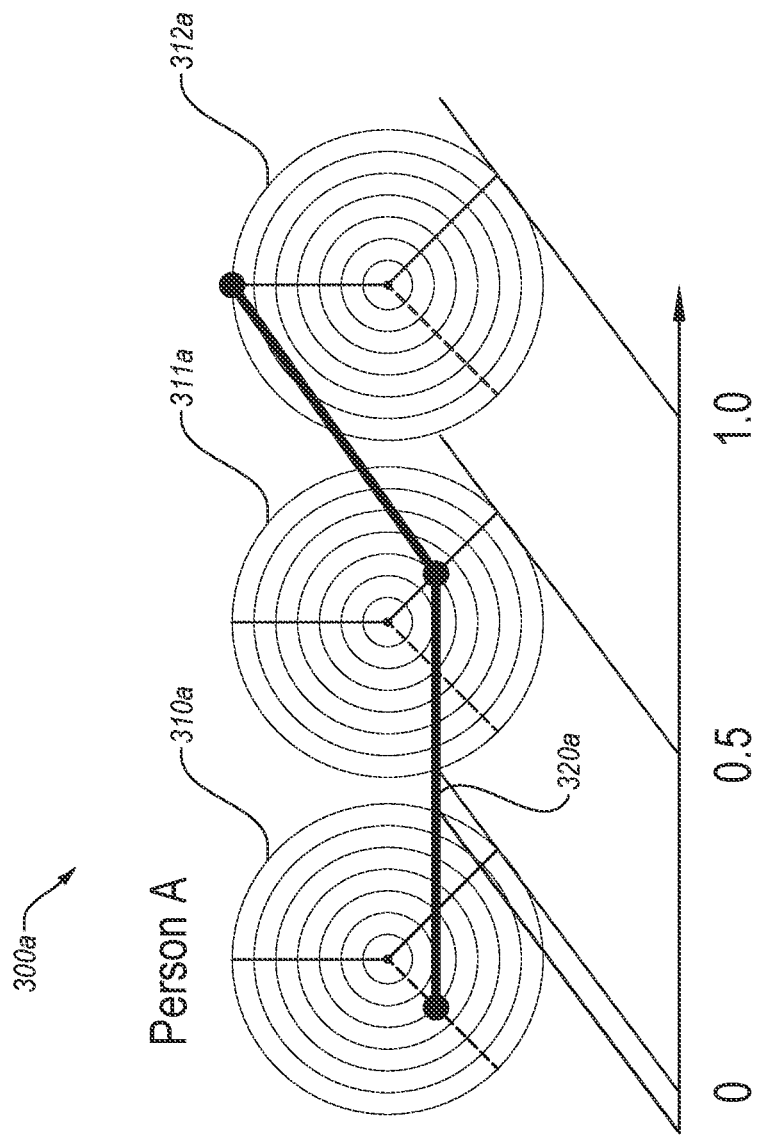
FIGS. 3A and 3B illustrate visual representations of time-series categorical data for two different individuals.
Figure 3B:
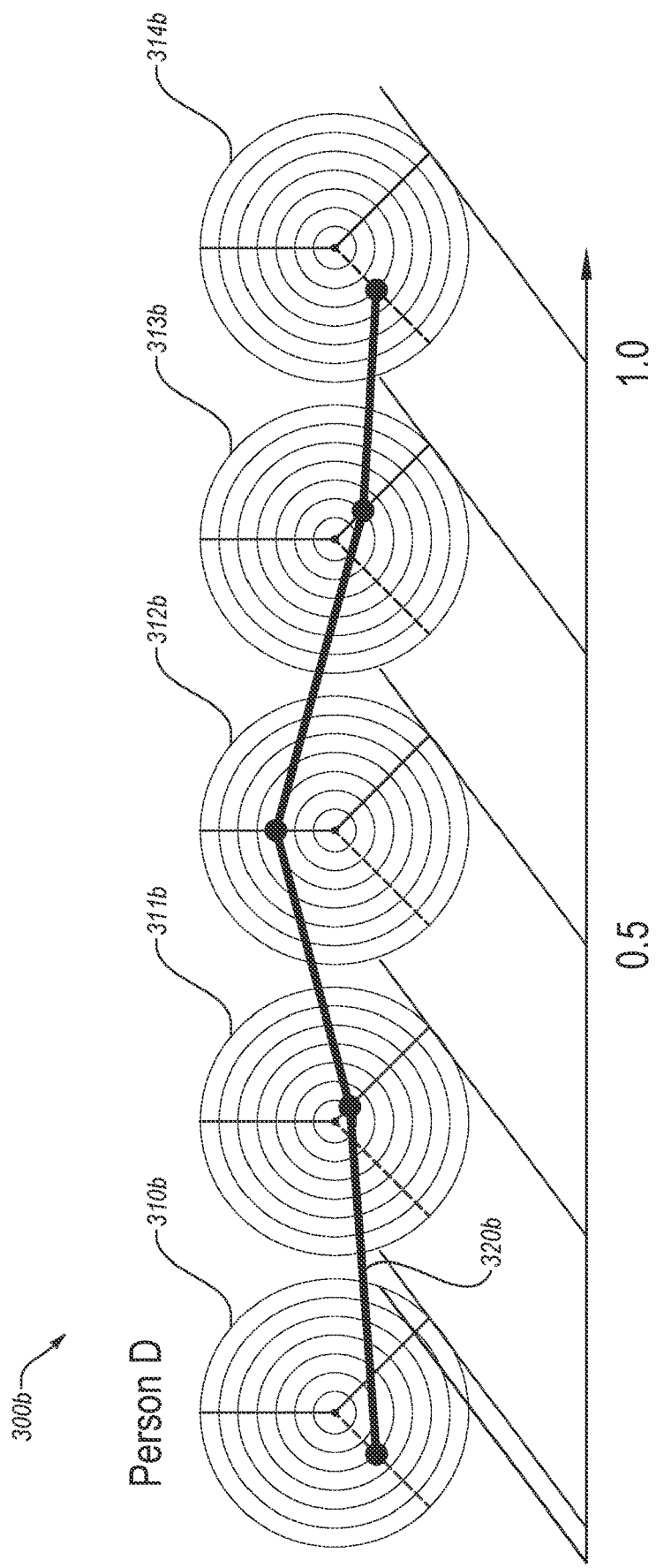
Figure 4:
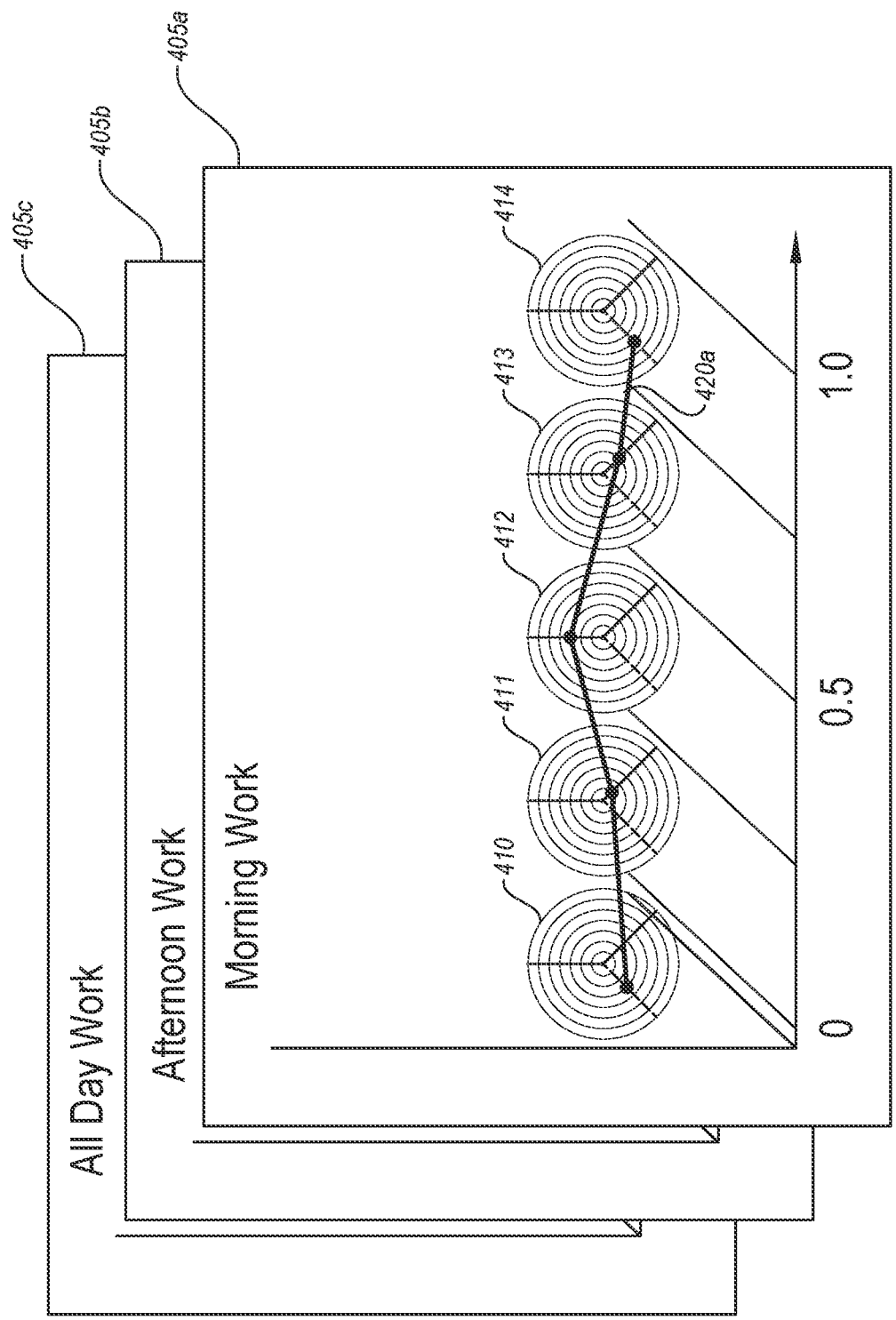
FIG. 4 illustrates a series of visual representations of ground truth models.

FIGS. 3A and 3B illustrate visual representations of time-series categorical data for two different individuals, in accordance with the present disclosure. FIG. 4 illustrates a series of visual representations of ground truth models, in accordance with one or more embodiments of the present disclosure.

As illustrated in FIGS. 3A, 3B, and 4 and merely for illustrative purposes, visual representations may include three axes corresponding to the text strings "home," "travel," and "office," following the examples of the present disclosure. The radial distance from the center of the circle of the visual representations may represent the count for the given axis. For example, visual representation 310a of FIG. 3A illustrates that Person A may have an initial entry on the "home" axis with a count of three, followed by a second visual representation 311a with an entry on the "travel" axis with a count of three, followed by a third visual representation 312a with an entry on the "office" axis with a count of seven. While the example categories of "home," "travel," and "office," are utilized, it will be appreciated that additional axes and/or different categories of locations may be utilized and that the various counts may be increased or decreased.

Also illustrated in FIGS. 3A, 3B, and 4 are a series of such visual representations for a given normalized time period. Such a time period may include an entire day (e.g., 24 hours), the hours of 6 AM to 11 PM, or any other such span of time. In some embodiments, the series of visual representations are normalized for a length that is based on the available data for a given day and/or based on the span of time utilized by the ground truth models.

As explained above in FIG. 3A, visual representations 310a, 311a, and 312a associated with the Person A may include successive entries on the "home" axis with a count of three, the "travel" axis with a count of three, and the "office" axis with a count of seven, respectively. Such a visual representation may correspond to a count vector of {"homes":3, "travel":3, "office":7}. Additionally or alternatively, a curve 320a may be generated corresponding to the combination of the visual representations 310a, 311, and 312a for the given time period.

With reference to FIG. 3B, visual representations 310b, 311b, 312b, 313b, and 314b associated with the Person B may include successive entries on the "home" axis with a count of three, the "travel" axis with a count of one, the "office" axis with a count of three, the "travel" axis with a count of two, and the "home" axis with a count of three, respectively. Such a visual representation may correspond to a count vector of {"home":3, "travel":1, "office":3, "travel": 2, "home":3}. Additionally or alternatively, a curve 320*b* may be generated corresponding to the combination of the visual representations 310*b*, 311*b*, 312*b*, 313*b*, and 314*b* for the given time period.

With reference to FIG. 4, a series of visual representations 410, 411, 412, 413, and 414 may be prepared and stored which represent ground truth models 405, such as a ground truth model 405*a* associated with individuals who go to work in an office in the morning, a ground truth model 405*b* associated with individuals who go to work in an office in the afternoon, and/or a ground truth model 40*ca* associated with individuals who go to work in an office for a full day. In some embodiments, a respective ground-truth curve 420 may be generated and associated with each of the ground truth models 405, such as the ground-truth curve 420*a* associated with the ground truth model 405*a* for individuals who work in an office in the morning. In these and other embodiments, each of the ground truth models 405 may represent a class of known individuals with a known and expected behavior (e.g., an expected model of a class "Morning Work" for a person who is at home, travels to their office for morning-hours work, and then travels home).

In these and other embodiments, the visual representations 410, 411, 412, 413, and 414 may use the same axes and radial scales as those used for candidate individuals (e.g., those individuals whose data will be compared to those of the ground truth models 405). Additionally or alternatively, the same time period (e.g., 24 hours or a full day, 6 AM to 11 PM, etc.) may be used for the ground truth models 405 as for the candidate individuals.

In some embodiments, the position data and/or the associated context vector, count vector or visual representations of the candidate individuals may be normalized and or categorized in such a manner that the axes, radial scale, and time period scale are the same as for the ground truth models 405.

In some embodiments, a distance between the curve of a given individual (e.g., the curve 320*a* for the Person A) may be measured from the ground truth models 405 for the classes of known individuals. For example, the curve 320*a* may be compared to the curves 420 of the ground truth models 405*a-c*. The ground truth model 405 from which the curve 320*a* has the shortest distance (e.g., the ground truth model 405 to which the curve 320*a* is closest) may be the class of individual to which the Person A is classified. Stated mathematically, $$\text{Categorized Class} = \arg\min_{i,k \in \mathbb{R}} \int \|g_t(k) - p_t(i)\|$$

where i may represent a PersonID of a candidate individual (e.g., Person A whose data is to be compared to the ground truth models), k may represent a class of ground truth (e.g., Morning Work, Afternoon Work, etc.), $g_t(k)$ may represent a ground truth model and/or an associated curve thereof (e.g., the curve 420*a* of FIG. 4) associated with the class of ground truth (k), and $p_t(i)$ may represent the data of the given person and/or an associated curve thereof (e.g., the curve 320*a* of FIG. 3A). By calculating the integral of the absolute value of the distance between the curve of the known ground truth model and the candidate individual across all known classes and selecting the minimum, the curve to which the candidate data most closely fits may be the class to which the individual is assigned.

Modifications, additions, or omissions may be made to FIGS. 3A, 3B, and 4 without departing from the scope of the present disclosure. For example, the visual representations may include more or fewer elements than those illustrated and described in the present disclosure. As another example, additional axes may be included in the visual representations.

Figure 5:
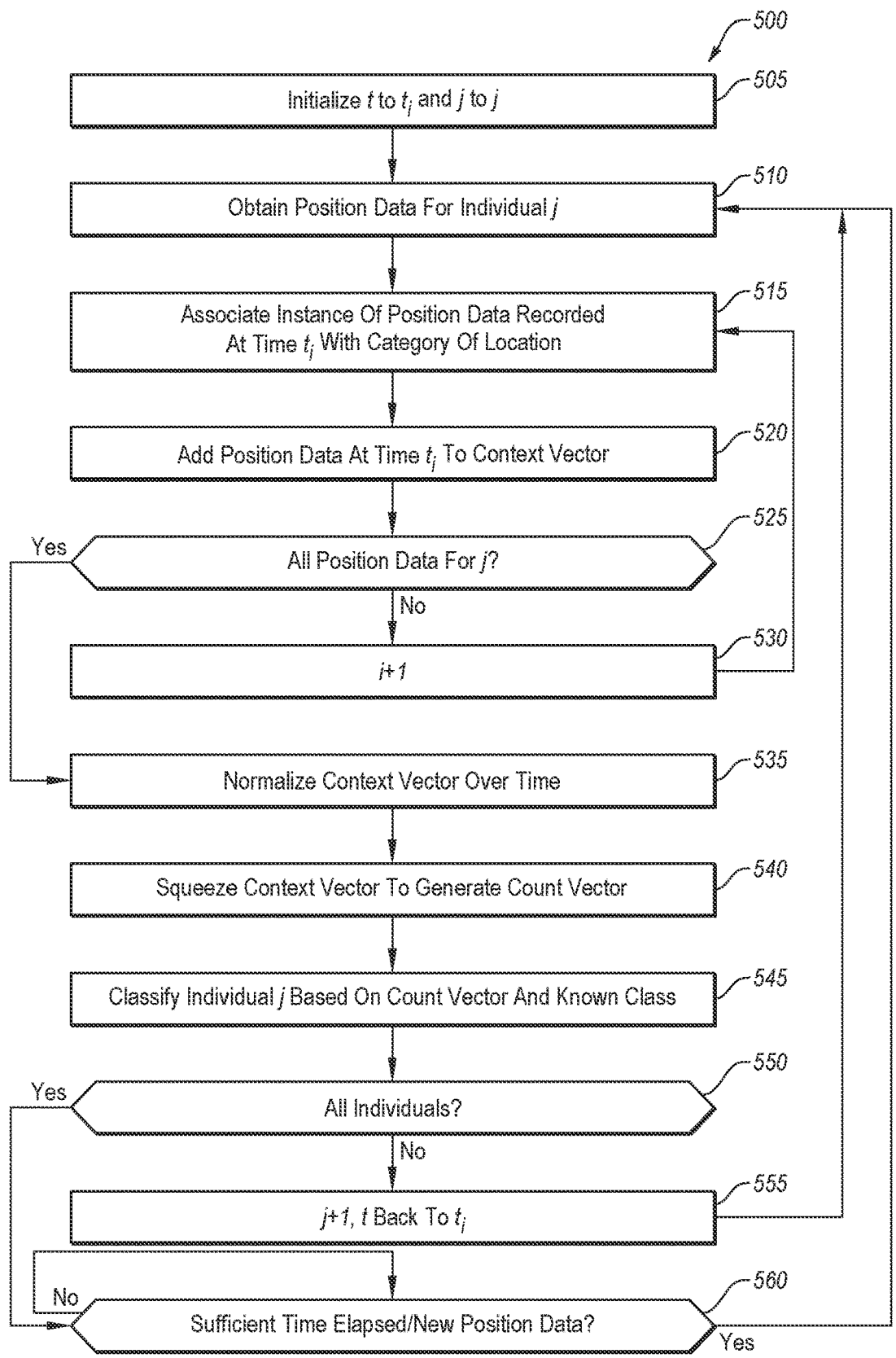
FIG. 5 is a flowchart of an example method of dynamic classification of time-series categorical data.

FIG. 5 is a flowchart of an example method 500 of dynamic classification of time-series categorical data, according to at least one embodiment described in the present disclosure. The method 500 may be performed by any suitable system, apparatus, or device. For example, the server 110, the electronic device 120*a*, and/or the electronic device 120*b* of FIG. 1 may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

At block 505, variables t and j may be initialized. For example, the variable t may refer to time at the point $t_i$ and the variable j may refer to an individual j.

At block 510, position data for the individual j may be obtained. For example, position data from an electronic device of the individual j may be provided to a server as the individual moves around throughout the day. Additionally or alternatively, the block 510 may include a server recalling stored position data for a given individual j when performing classification of the individual j.

At block 515, an instance of the position data recorded at time $t_i$ may be associated with a category of location. For example, the position data may be associated with "home," "travel," or "office."

At block 520, the position data at time $t_i$ may be added to a context vector. For example, the context vector may include a series of text strings to which the category of location for the time $t_i$ may be added.

At block 525, a determination may be made whether all available position data for the person j has been included in the context vector. If there is additional position data, the method 500 may proceed to the block 530. If there is no additional position data (e.g., all currently available position data for the person j has been included), the method 500 may proceed to the block 535.

In some embodiments, if the person j has over-sampled data, the determination at the block 525 may represent a determination of whether or not sufficient data has been analyzed to construct a context vector consistent with the time and/or scale of the ground truth models to which the candidate data of the person j is to be compared. Or stated another way, rather than incorporating all position data from the person j, a subset of the position data of the person j may be included in the context vector and the method 500 may still proceed to the block 535.

At block 530, the value of i may be incrementally increased and the method 500 may return to the block 515 such that the position data of a next point $(t_{i+1})$ in time may be associated with a category of location and added to the context vector.

At block 535, the context vector may be normalized over time. For example, under-sampled data may have one or more data entries duplicated. As another example, for over-sampled data, one or more data entries may be discarded. In some embodiments, an averaging or other mathematical or statistical analysis may be performed to normalize the context vector over time. In these and other embodiments, the normalization may be based on a scale of ground truth models.

At block 540, the context vector may be squeezed to generate a count vector. For example, successive instances of text strings that have the same value may be condensed into a single entry and a count of the quantity of successive entries that are compressed in such a manner may be retained.

At block 545, the individual j may be classified based on the count vector and known classes. For example, the count vector for the individual j as a candidate individual may be compared to ground truth models such that the class of the closest ground truth model may be the class to which the individual j is classified. An example of such classification may be described with greater detail in reference to FIG. 6.

At block 550, a determination may be made whether all individuals to be classified (e.g., all candidate data) has been classified. If not all of the individuals have been classified, the method 500 may proceed to the block 555. If all of the individuals have been classified, the method 500 may proceed to the block 560.

At block 555, the value of j may be incremented, and the value of t may be reverted back to $t_i$ such that a next individual may have their position data analyzed beginning at the same time as the initial individual j. After the block 555, the method 500 may return to the block 510.

At block 560, a determination may be made whether sufficient time has elapsed or sufficient new data has been obtained to re-classify or verify the classification of an individual. For example, an initial classification for an individual may be performed at 11 AM. However, it may be difficult to predict whether the individual properly belongs to a Morning Work or All Day Work class. As such, after a certain amount of time has elapsed, it may be beneficial to re-classify the individual. In these and other embodiments, as additional position data with associated time entries are obtained, an expanded context vector may be created to incorporate the additional position data. Such an expanded context vector may be squeezed to create an expanded count vector, and the expanded count vector may be used to re-classify the individual.

In addition to re-classification in a given day, it may be beneficial to periodically verify the classification of an individual, such as on a weekly, monthly, quarterly, semi-annually, or annual basis to verify that an initial classification is accurate.

In addition to the passage of time, the acquisition of new data may also trigger a re-classification. For example, if four new data points according to a normalized scale have been obtained for a given individual, the system may re-analyze the individual to verify and/or re-classify the individual.

If sufficient time has elapsed and/or new position data has been obtained, the method 500 may return to the block 510. If there has not been sufficient passage of time or insufficient data has been obtained, the method 500 may return to the block 560 to continue to monitor for such a condition.

While the method 500 addresses the classification of one or more individuals, it will be appreciated that the classification of the method 500 may be used in important and meaningful ways. For example, the classification obtained via the method 500 may be used to facilitate improvements or modifications to various factors relating to the flow of human traffic. For example, using the classification, a clear and accurate prediction may be made of a number of people who will be traveling at a given time of day, the modality by which they will travel, a point of origin and a destination point for their travel, and their purpose for travel. Using that information from the classification, various actions may be taken to adjust or influence the flow of human traffic. Such modifications may include actions such as adjusting a routing algorithm when providing directions to individuals (e.g., a map application or routing guidance system may adjust the route suggested based on the classification of individuals and the number of individuals that may be predicted to be traveling in a given region and/or a given time of day). As another example, such modifications may include changing a quantity of buses running on a given route, adjusting bus routes, or adjusting the frequency with which buses run on the given route. As a further example, such modifications may include adjusting a frequency of trains running on a given line. As another example, such modifications may include changing a bus fare for the given route (e.g., decreasing bus fares in times in which many individuals will be traveling to incentive use of the bus). As a further example, such modifications may include changing a train fare for the given route (e.g., decreasing train fares to incentive individuals to use the train). As another example, such modifications may include changing a toll on a given road (e.g., increasing tolls on a first route to disincentivize individuals from taking the first route and/or decreasing tolls on a second route to incentivize individuals to take the second route). It will be appreciated that these are merely illustrative examples of actions to be taken based on the classification, and any number or combination of such actions may be undertaken.

Modifications, additions, or omissions may be made to the method 500 without departing from the scope of the present disclosure. For example some of the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 6:
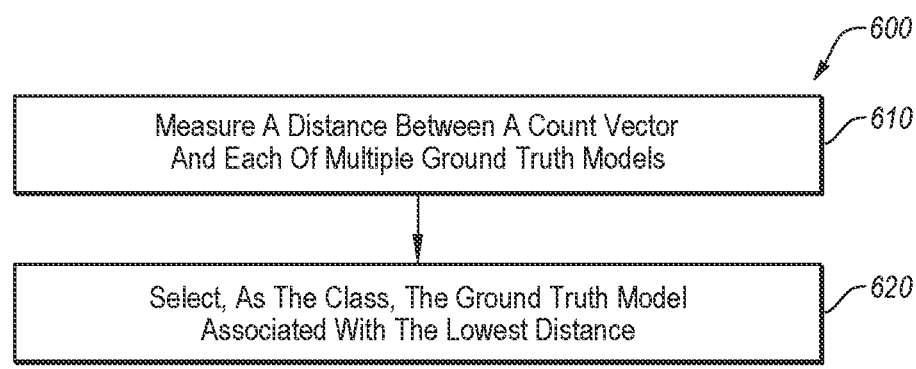
FIG. 6 is a flowchart of an example method of classifying an individual based on a count vector.

FIG. 6 is a flowchart of an example method 600 of classifying an individual based on a count vector, in accordance with one or more embodiments of the present disclosure. The method 600 may be performed by any suitable system, apparatus, or device. For example, the server 110 of FIG. 1 may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation. The method 600 may include an expansion of the block 545 of FIG. 5.

At block 610, a distance between a count vector and each of multiple ground truth models may be measured. For example, a normalized curve of the count vector of an individual may be compared to each of the multiple ground truth models. The absolute value of the difference between the two may be determined and an integral of the absolute values of the differences across the curves may be calculated.

At block 620, the known class to which the candidate individual is to be assigned may be selected as the class corresponding to the ground truth model with the lowest distance as measured at the block 610. Stated another way, the candidate individual may be classified in the known class whose ground truth model is closest to the count vector of the candidate individual. For example, the ground truth model with the lowest integrated absolute value of the distances between the curve of the count vector and the curves of the ground truth models maybe selected.

Modifications, additions, or omissions may be made to the method 600 without departing from the scope of the present disclosure. For example some of the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 7:
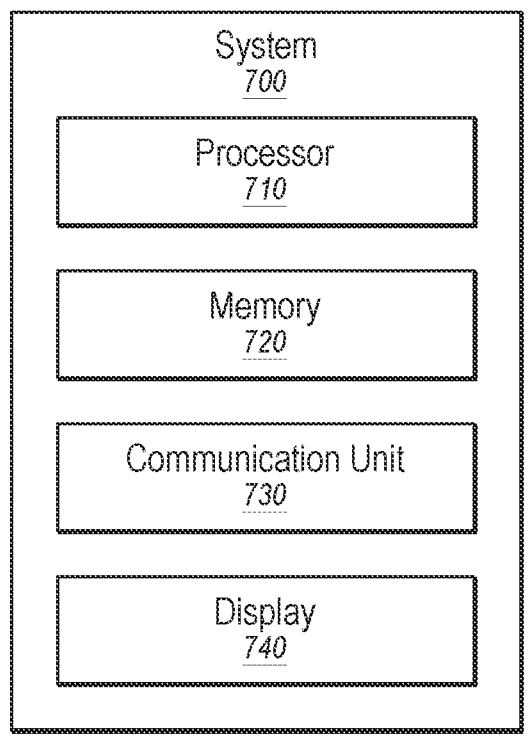
FIG. 7 illustrates an example computing device.

FIG. 7 illustrates a block diagram of an example computing system 700, according to at least one embodiment of the present disclosure. The computing system 700 may be configured to implement or direct one or more operations associated with a tracking server (e.g., the tracking server 110 of FIG. 1). The computing system 700 may include a processor 710, a memory 720, a data storage 730, and/or a communication unit 740. The processor 710, the memory 720, the data storage 730, and/or the communication unit 740 may be communicatively coupled.

In general, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, the processor 710 may include any number of processors configured to, individually or collectively, perform or direct performance of any number of operations described in the present disclosure. Additionally, one or more of the processors may be present on one or more different electronic devices, such as different servers. In some embodiments, the processor 710 may interpret and/or execute program instructions and/or process data stored in the memory 720, the data storage 730, or the memory 720 and the data storage 730.

In some embodiments, the processor 710 may be configured to interpret and/or execute program instructions and/or process data stored in the memory 720, the data storage 730, or the memory 720 and the data storage 730. In some embodiments, the processor 710 may fetch program instructions from the data storage 730 and load the program instructions in the memory 720. After the program instructions are loaded into memory 720, the processor 710 may execute the program instructions, such as instructions to perform any of the methods 500 and/or 600 of FIGS. 5 and 6, respectively.

The memory 720 and the data storage 730 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

Modifications, additions, or omissions may be made to the computing system 700 without departing from the scope of the present disclosure. For example, in some embodiments, the computing system 700 may include any number of other components that may not be explicitly illustrated or described.

As indicated above, the embodiments described in the present disclosure may include the use of a special purpose or general purpose computer including various computer hardware or software modules, as discussed in greater detail below. Further, as indicated above, embodiments described in the present disclosure may be implemented using computer-readable media for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. This interpretation of the phrase "A or B" is still applicable even though the term "A and/or B" may be used at times to include the possibilities of "A" or "B" or "A and B."

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    obtaining position data and associated time entries for a plurality of individuals;
    for each of the plurality of individuals:
        associating instances of the position data with categories of locations to generate a context vector, the context vector including text strings describing a context of a given individual; and
        squeezing the context vector to combine consecutive categories of locations to generate a count vector, the count vector including the text strings and a count of the consecutive categories of locations;
    classifying each of the plurality of individuals based on a comparison of the count vector to a known class of individuals; and
    adjusting at least one factor directing flow of a plurality of people in a different manner based on the classification.

2. The method of claim 1, wherein the classifying each of the plurality of individuals includes comparing the count vector to a set of ground truth models associated with a set of known classes of individuals including the known class of individuals.

3. The method of claim 2, wherein the classifying each of the plurality of individuals comprises:
    measuring a distance between the count vector of a given individual and each of the ground truth models; and
    selecting the known class of individuals from the set of known classes of individuals based on the known class of individuals having a lowest absolute distance between the count vector of the given individual and the ground truth model of the known class of individuals.

4. The method of claim 1, further comprising:
    continuing to receive additional position data and additional associated time entries;
    associating instances of the additional position data with the categories of locations to generate an expanded context vector that includes both the position data and the additional position data;
    squeezing the expanded context vector to generate an expanded count vector; and
    re-classifying at least one of the plurality of individuals based on a second comparison of the expanded count vector to the known class of individuals.

5. The method of claim 4, wherein the squeezing the expanded context vector and the re-classifying are performed only after receiving a threshold amount of the additional position data.

6. The method of claim 1, wherein the context vector is normalized over time.

7. The method of claim 6, wherein the normalization over time includes selecting one of the text strings for a given unit of time.

8. The method of claim 1, wherein the categories of locations include at least one of at home, moving, and at work.

9. The method of claim 8, wherein the known class of individuals includes at least one of works from home, works a full day in an office, works morning hours in the office, and works afternoon hours in the office.

10. The method of claim 1, wherein the categories of locations include at least one of moving by train and moving by automobile.

11. The method of claim 1, wherein the at least one factor includes at least one of a routing algorithm when providing directions to the plurality of people, a quantity of buses running on a given route, a frequency of trains running on a given line, a bus fare for the given route, a train fare for the given route, and a toll on a given road.

12. One or more non-transitory computer-readable media containing instructions that, when executed by one or more processors, cause a system to perform operations, the operations comprising:
    obtaining position data and associated time entries for a plurality of individuals;

for each of the plurality of individuals:
- associating instances of the position data with categories of locations to generate a context vector, the context vector including text strings describing a context of a given individual; and
- squeezing the context vector to combine consecutive categories of locations to generate a count vector, the count vector including the text strings and a count of the consecutive categories of locations;

classifying each of the plurality of individuals based on a comparison of the count vector to a known class of individuals; and generating instructions to adjust at least one factor directing flow of a plurality of people in a different manner based on the classification.

13. The non-transitory computer-readable media of claim 12, wherein the classifying each of the plurality of individuals includes comparing the count vector to a set of ground truth models associated with a set of known classes of individuals including the known class of individuals.

14. The non-transitory computer-readable media of claim 13, wherein the classifying each of the plurality of individuals comprises:
- measuring a distance between the count vector of a given individual and each of the ground truth models; and
- selecting the known class of individuals from the set of known classes of individuals based on the known class of individuals having a lowest absolute distance between the count vector of the given individual and the ground truth model of the known class of individuals.

15. The non-transitory computer-readable media of claim 12, wherein the operations further comprise:
- continuing to receive additional position data and additional associated time entries;
- associating instances of the additional position data with the categories of locations to generate an expanded context vector that includes both the position data and the additional position data;
- squeezing the expanded context vector to generate an expanded count vector; and
- re-classifying at least one of the plurality of individuals based on a second comparison of the expanded count vector to the known class of individuals.

16. The non-transitory computer-readable media of claim 15, wherein the squeezing the expanded context vector and the re-classifying are performed only after receiving a threshold amount of the additional position data.

17. The non-transitory computer-readable media of claim 12, wherein the context vector is normalized over time.

18. The non-transitory computer-readable media of claim 17, wherein the normalization over time includes selecting one of the text strings for a given unit of time.

19. The non-transitory computer-readable media of claim 12, wherein the categories of locations include at least one of at home, moving, and at work.

20. The non-transitory computer-readable media of claim 12, wherein the at least one factor includes at least one of a routing algorithm when providing directions to the plurality of people, a quantity of buses running on a given route, a frequency of trains running on a given line, a bus fare for the given route, a train fare for the given route, and a toll on a given road.

* * * * *